June 11, 1935.  L. DAUM  2,004,856
AMMUNITION SUPPLYING DEVICE FOR PAIRS OF
GUNS MOUNTED IN TURRETS OR THE LIKE
Filed Oct. 14, 1933  6 Sheets-Sheet 1

INVENTOR
Leon Daum
BY Cameron, Kerkam & Sutton
ATTORNEYS

June 11, 1935.                    L. DAUM                    2,004,856
              AMMUNITION SUPPLYING DEVICE FOR PAIRS OF
                GUNS MOUNTED IN TURRETS OR THE LIKE
                     Filed Oct. 14, 1933        6 Sheets-Sheet 2

INVENTOR
Leon Daum
BY Cameron, Kirkam & Sutton
ATTORNEYS.

June 11, 1935. L. DAUM 2,004,856
AMMUNITION SUPPLYING DEVICE FOR PAIRS OF
GUNS MOUNTED IN TURRETS OR THE LIKE
Filed Oct. 14, 1933 6 Sheets-Sheet 3

INVENTOR
Leon Daum
BY Cameron, Kerkam & Sutton
ATTORNEYS

Patented June 11, 1935

2,004,856

UNITED STATES PATENT OFFICE 2,004,856

AMMUNITION SUPPLYING DEVICE FOR PAIRS OF GUNS MOUNTED IN TURRETS OR THE LIKE

Leon Daum, Paris, France, assignor of one-half to Compagnie des Forges et Acieries de la Marine et d'Homecourt, Paris, France, a company of France, and one-half to Schneider & Cie, Paris, France, a company of France Application October 14, 1933, Serial No. 693,654
In France August 19, 1933

14 Claims. (Cl. 89—45)

In my application for a United States patent filed on July 24, 1933, Serial No. 681,980, there is described and shown a device for simultaneously supplying with ammunition two guns associated for simultaneous aiming in direction. The device is characterized in principle by a frame swivelling in a fixed support and supporting a receiving member adapted to be given a pivoting movement about an axis coinciding with the axis of the trunnions of the cradles of the associated guns or parallel to this latter axis. The ammunition hoisted in fixed conduits is received in sockets provided in the receiving member, the frame wherein the receiving member is pivotably mounted having been preliminarily rotated in such manner that the sockets form an extension of the conduits serving for the hoisting of the munitions. This operation completed, and the ammunition being placed in its receiving sockets, the swivelling frame is moved to bring the pivoting axis of the receiving member into line with or parallel to the axis of the trunnions of the associated guns. Subsequent pivoting of the receiving member, inside the frame, permits the sockets to be brought into a suitable position for the conveyance of the ammunition towards a suitable loading device, by means of a conduit provided for this purpose and arranged parallel to the symmetrical plane of the installation.

The object of the present invention is to provide a novel constructional arrangement of the apparatus just referred to which is especially adapted for use in the case of two associated guns which are to be loaded with ammunition constituted by separate elements, that is to say, by a projectile separated from its firing charge which may or may not be contained in a cartridge case. In brief, the constructional form hereinafter described and shown in the annexed drawing permits two guns associated for simultaneous aiming in direction to be supplied with ammunition comprising separate elements, the invention comprising the combination of the means for arriving at this result by a modification and an improvement of the device forming the subject-matter of my prior application Serial No. 681,980.

In the annexed drawings which show by way of example, the application of the present invention to associated guns installed in a turret.

Figure 1:
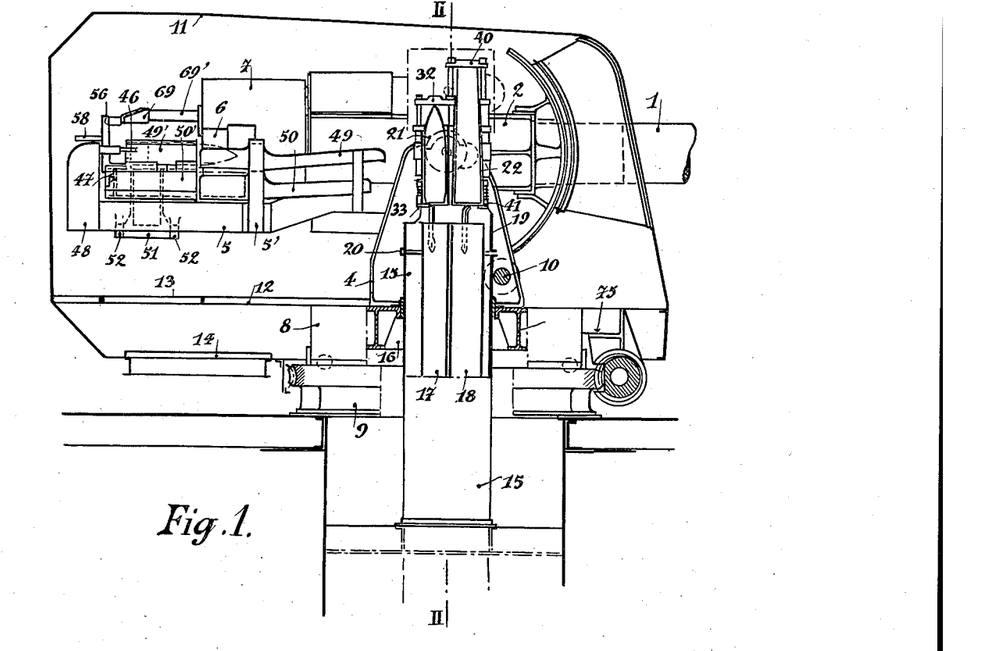
Figure 1 is a longitudinal section, in elevation, of a turret in which is embodied one form of the present invention.
Figure 2:
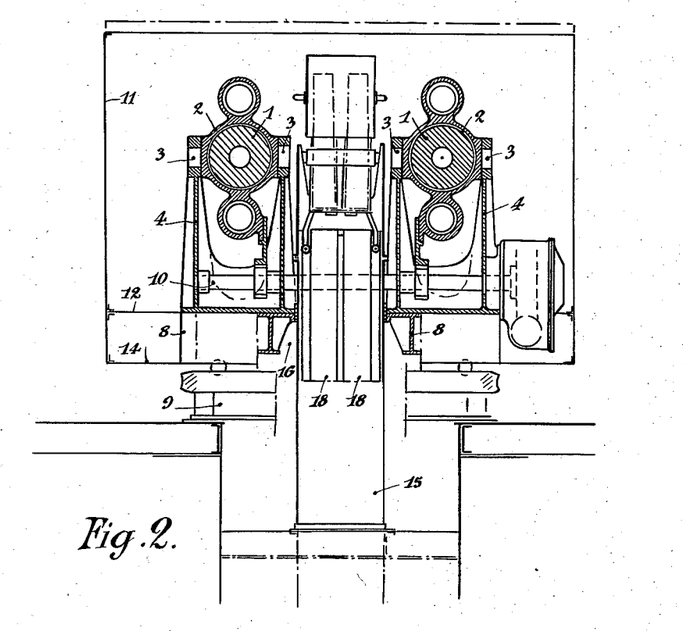
Figure 2 is a cross-section through the axis of rotation of the turret, that is to say, on the line II—II of Figure 1.
Figure 3:
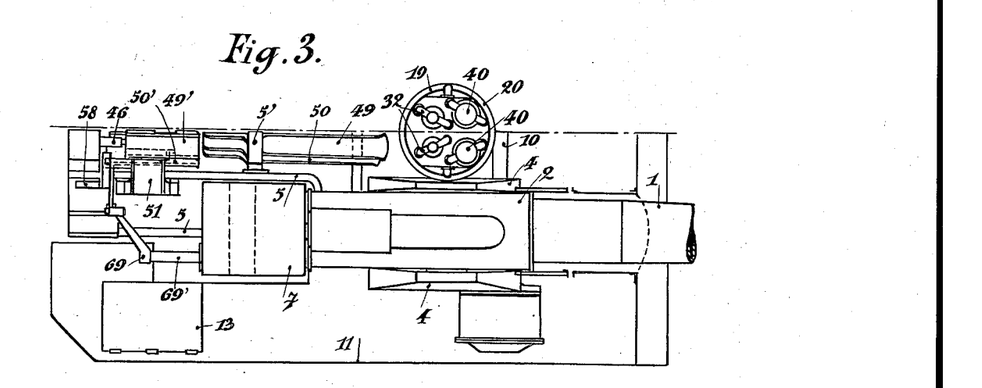
Figure 3 is a half plan view corresponding to Figure 1.

In Figures 1, 2 and 3, 1 indicates the guns mounted in known manner in cradles 2. These cradles rest by their trunnions 3 on mountings or cradle supports 4.

To the cradle of each of the guns are fixed, in known manner and as in the example described in application Serial No. 681,980, in addition to the usual firing members, two longitudinal members 5 which at the rear support the loading device.

It is presumed, by way of example, that each gun comprises a horizontal wedge breech block. A recess 6 made in the breech block 7 (Figure 1) allows the passage of the two portions of the ammunition when conveyed from the waiting position to the loading positions.

The cradle supports 4 are, in the example shown, fixed on a rotatable platform 8 which is mounted on a fixed bearing 9 by means of a rolling and centering track.

For aiming in elevation, the two cradles carrying the guns may be, for example, connected with a single aiming shaft 10 through the usual rack and pinion elevating gear.

The platform 8 may support a shield 11 forming a firing chamber and an operating floor 12. This floor comprises at the rear a hinged element 13 adapted to be closed flat, which may be raised upright to enable the attendant manipulating the element of the conveyor device forming the loader to descend to the lower floor 14 for convenience of operation when loading at high angles of elevation.

The part of the device forming the ammunition receiving apparatus is arranged, as in the construction described in application Serial No. 681,980, along the vertical axis of rotation of the turret, between the two guns, opposite the mouth of the shaft of a fixed central hoist 15. This hoist opens through an opening 16 provided in the centre of the platform 8.

The actual hoist may be of a known type with a reciprocating hoisting mechanism such as shown on the drawings; it comprises according to the present embodiment of the invention, four tubes, two tubes 17 intended for the projectiles, and two tubes 18 intended for the powder charge which may or may not be contained in cartridge cases; in these four tubes the ammunition for the two guns is raised simultaneously, in order to permit simultaneous firing by the two guns and at the same cadence.

The ammunition receiving element of the apparatus is shown in detail in Figures 4 to 10.

This apparatus comprises, as in the example of application Serial No. 681,980, a kind of frame or support 19 adapted to pivot about its vertical geometric axis, which is at the same time the axis common to the turret and to the central hoist. The centering of the said swivelling frame is ensured, at its base, by a ball bearing 20 or by any other equivalent device.

The receiving sockets for the ammunition elements such as the projectiles and the cartridge cases, for example, may be formed in a common rocking ammunition carrier, constituted by four tubes (Figures 7, 8), two tubes 21 intended for the projectiles, and two tubes 22 intended for the cartridge cases; these four tubes are connected and braced together by three mountings 23, 24 and 25. The intermediate mounting 24 is provided with two horizontal trunnions 26 supported by the pivoting frame or support 19, in suitable seats, the axis of which may be moved to coincide with the common axis of the trunnions of the cradles 2 by rotating frame 19 on its bearing 20. A fourth mounting 27 connects and stays the two tubes 22 at their upper part.

Figure 4:
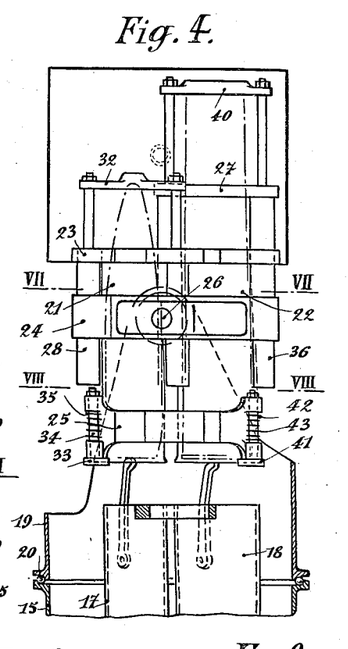
Figures 4, 5, 6, 7, 8, 9, and 10 show in detail, on a larger scale, the part of the device where the ammunition is received at its exit from the hoist, Figure 4 being a sectional elevation similar to that of Figure 1, Figure 5 being a view similar to that of Figure 2, Figures 6, 7 and 8 being sectional plans respectively on the lines VI—VI of Figure 5, and VII—VII and VIII—VIII of Figure 4, and Figures 9 and 10 being sectional elevations on the lines IX—IX and X—X respectively of Figure 7.
Figure 5:
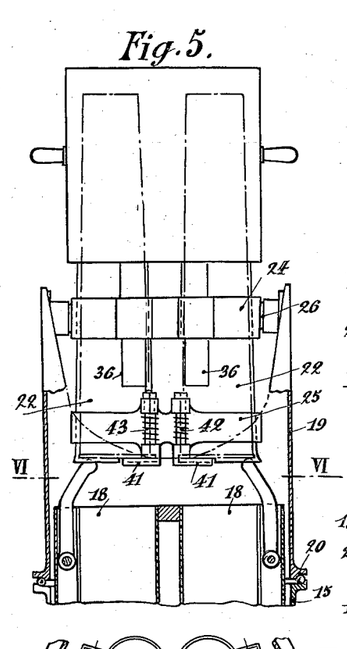
Figures 6, 7, 8:
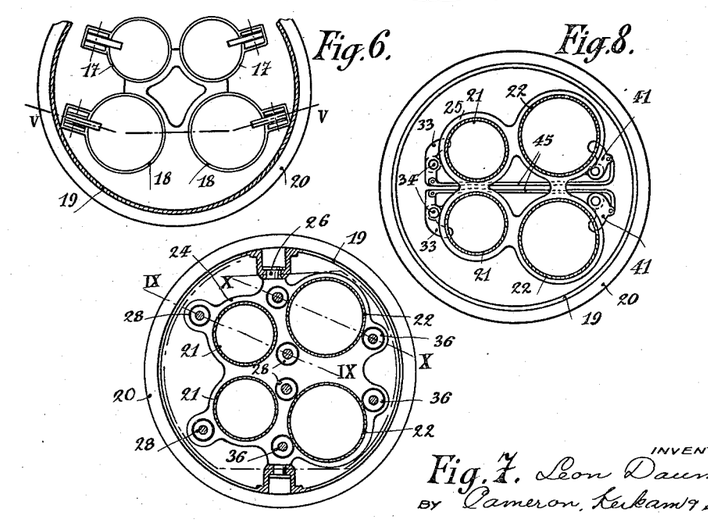
Figure 9:
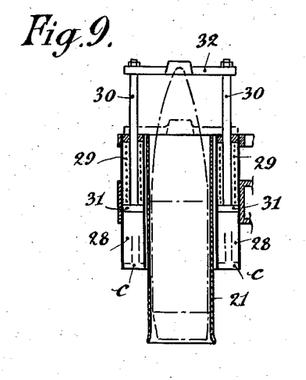
Figure 10:
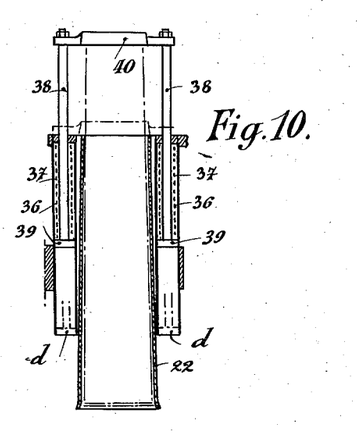

On each of the two projectile-receiving tubes 21 of the rocking ammunition carrier are mounted two spring boxes 28 (Figures 7 and 9) arranged symmetrically, and each comprising a spring 29 and a central rod 30 carrying a plunger 31 at its lower end. At their upper ends, the two rods 30 are connected together by a cross piece 32 (Figures 4 and 9), the middle of which is adapted to form an abutment socket for the ogive of the projectile. At the lower part of each tube 21 is provided a retractable (or withdrawable) pawl 33 rotatably movable on an axis 34 and constantly returned into the position of Figure 8 by a torsion spring 35 (Figure 4).

On each of the two tubes 22 intended for the powder or cartridge cases there are mounted in a similar manner two spring boxes 36 (Figures 7 and 10), each comprising a spring 37 and a central rod 38 carrying a plunger 39. A cross piece 40 connects the upper part of the two rods 38; its middle is arranged to form a kind of plate serving as a support for the upper part of the cartridge case. At the lower part of each tube 22 is arranged a retractable (or effaceable) pawl 41 (Figures 4 and 8) rotatably movable on an axis 42 and constantly drawn into the position of Figure 8 by a torsion spring 43 (Figure 4).

The part of the apparatus forming the ammunition receiving device which has just been described may be operated by an attendant installed in the front between the two guns, on the floor 75 (Figure 1).

The above described devices render it possible to supply the two guns of the turret with ammunition under the following conditions:

On the starting of the actual hoist, the receiving device is first swivelled in direction so that the tubes 21 and 22 of the rocking ammunition carrier, which are then situated vertically, are respectively in line with the hoist tubes 17 and 18 of the hoist. The pivoting support 19 is then locked to the fixed shaft 15 in any suitable manner (not shown).

The hoist being started, the projectiles and the cartridge cases separately enter at the end of their travel the tubes 21 and 22, moving the pawls 33 and 41 out of the way. The points of the projectiles and the upper parts of the cartridge cases abut respectively against the cross pieces 32 and 40 of the draw-rods of the spring boxes which, when the carrier was empty, were at the broken line positions (c) and (d) indicated in Figures 9 and 10, the springs being relaxed. The projectiles and the cartridge cases continuing their movement, raise the cross pieces 32 and 40, compressing the springs 29 and 37, up to the moment when the projectiles and cartridge cases have penetrated completely into the sockets of the carrier. The pawls 33 and 41 then engage underneath the projectiles and cartridge cases, thereby causing the hoist to stop, for example due to the operation of a limit switch.

The receiving apparatus being charged, is then swivelled according to the actual position of the turret, so that the pivots 26 of the rocking ammunition carrier are brought into line with the trunnions of the gun cradles. When in this position, the pivoting support 19 of the apparatus may be locked on the platform 8 by means of a locking device not shown.

The ammunition carrier 21, 22 is then rocked until the axes of its sockets are in line with the axes of channels or gutters 49 and 50 carried for each gun, by an arm 5' integral with the cradle.

As this movement is completed each of pawls 33 strikes against a nose 44 projecting from the corresponding channel 49 (Figure 4), which causes the said pawls 33, and the pawls 41 connected to the former as by a system of connecting rods 45, to be moved aside.

The projectiles and the cartridges, being no longer held by the corresponding pawls, are then forced to the rear by cross pieces 32 and 40 due to the release of the spring devices 29, 30, 31, and 37, 38, 39.

As will be seen, the part of the receiving and conveying device which has just been described 70 is an adaptation or modification of the corresponding device of application Serial No. 681,980 for the case in which the ammunition is, for each gun, constituted by two separate elements such as a projectile and a cartridge case provided with the propelling charge. However, in view of this adaptation, the superposed channels 49 and 50 are not extended all the way to the rear of members 5 so as to bring the charge to a position whence it will be transferred by rolling by hand along the axis of the gun. In other words, the ammunition elements instead of being brought, as in the case of the cartridge in the example of application Serial No. 681,980, to the end of a continuous channel, are, according to the present invention, each delivered from channels 49 and 50 to a channel or tray element (49', 50') forming part of an oscillating loading device which will presently be described. The power of the springs 29 and 37 is chosen to ensure the sliding of the ammunition elements up to their abutment against suitable shock-absorbing pawls 46 and 47 provided on the rear cross piece 48 of the longitudinal members 5, after engagement of the said elements in the channels or trays 49', 50' of the loading device. This result is ensured even for the minimum angle of elevation of the guns.

The empty ammunition carrier 21—22 is then, as in the example of application Serial No. 681,980, moved back to the vertical and swivelled again in direction to receive a further charge coming from the hoist.

Figure 14:
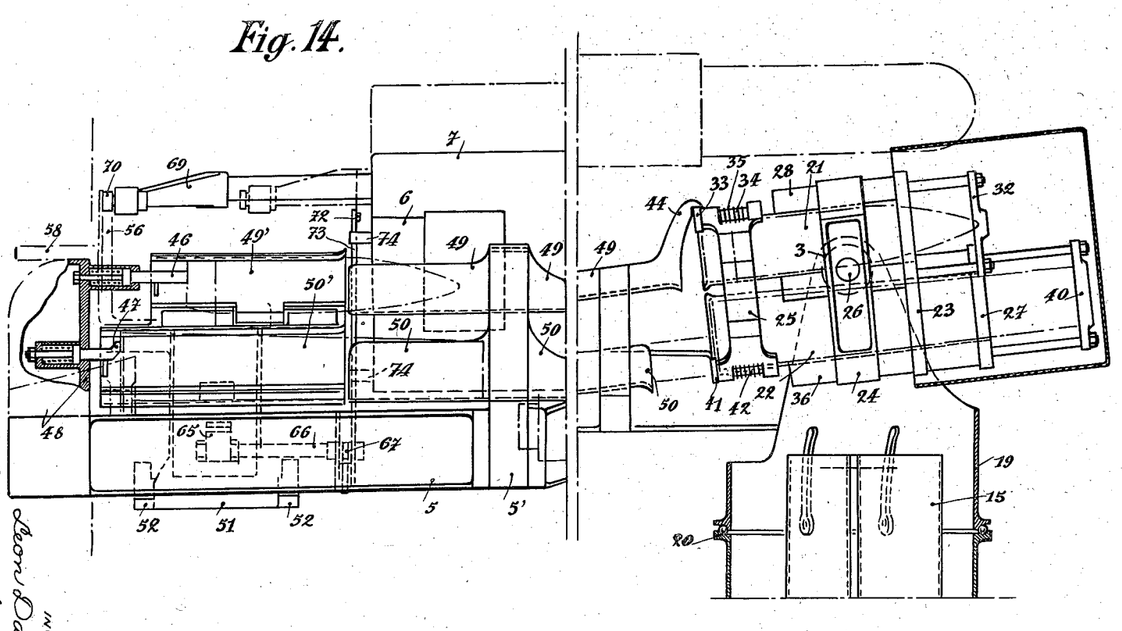

The part of the apparatus forming the loading device (Figures 11 and 14) which in operation is, as has been seen, connected to the receiving part of which it constitutes the extreme rear element, is constituted by a double channel or tray 49'—50' pivotally connected at 59 to the extremity of an arm 51 which is itself pivotally connected at 60 to two supports 52 fixed to the longitudinal member 5.

The unit formed by the channels 49' and 50' is also pivotally connected at 53, to a rod or lever 54 (Figures 11 to 13) which is itself pivotally mounted at 54', on a support 55 integral with the longitudinal members 5.

Figure 16:
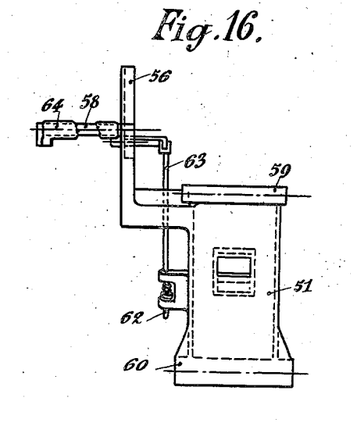
Figures 16, 17 and 18 show separately in front view, back view and plan, the pivoting support to which is hinged the system of rearmost movable elements of the receiving conduits for the ammunition.
Figure 17:
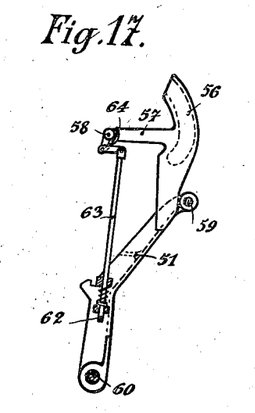
Figure 18:
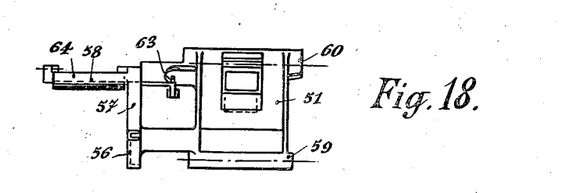

The arm 51 carries, at the side and at the back (Figures 16 to 18), a fork 56—57 of which one of the prongs 56, in the form of a directing cam, is intended to control the rammer 69, while the other prong 57 carries a handle 58 for the manipulation of the entire movable portion of the ammunition receiving device forming the loader.

Figures 11, 12:
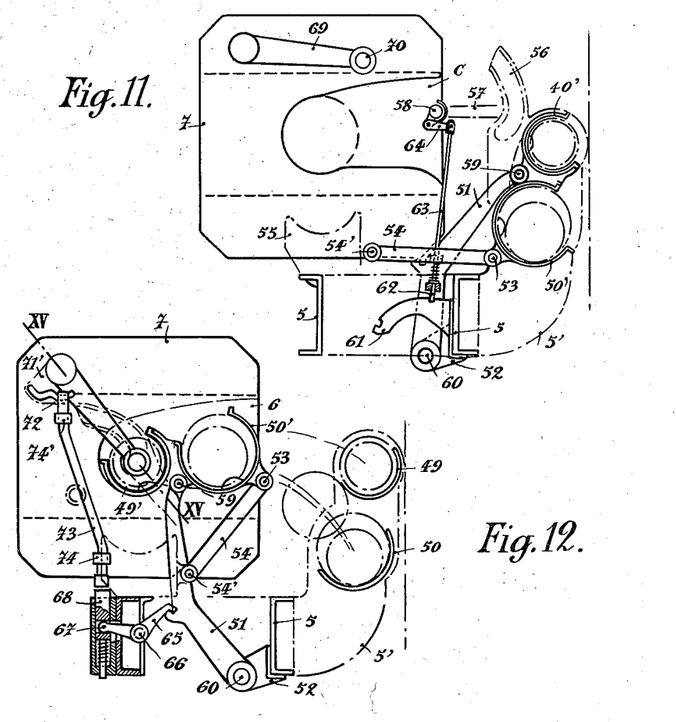
Figures 11, 12, 13 and 14 show a detail of a part of the device where the ammunition conveyed from its point of reception at the top of the hoist is brought in line with the axis of the gun, to be rammed into position, Figure 11 being an end elevation view of the back of one of the associated firing pieces and showing the members in the position which they occupy in Figure 14, which is a corresponding longitudinal elevation, Figures 12 and 13 being views similar to that of Figure 11, the members being shown in different position.
Figure 13:
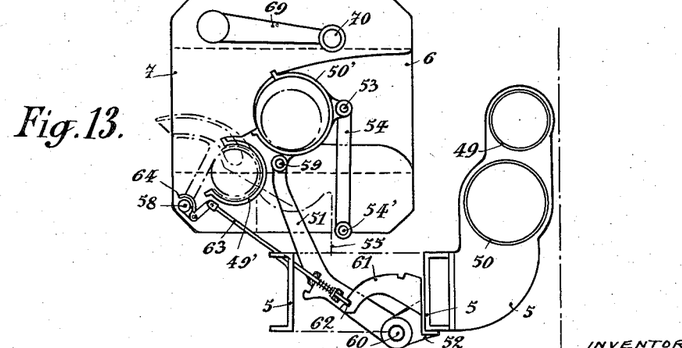

By acting on the manipulating handle 58, the attendant produces, for the unit formed by the channels or trays 49' and 50', a double movement of rotation about axes 59 and 60, in such manner that by a continuous action the said attendant may bring the loading element from the position shown in Figure 11, successively into the two positions shown by Figures 12 and 13.

At the two extreme positions of its travel, that is to say, in the waiting position (Figure 11) and in the position of loading the powder or cartridge case (Figure 13), the loading device is automatically locked to a sector 61 fixed to the longitudinal members 5. This locking is effected by means of a spring catch 62, formed at the end of a rod 63, guided on the arm 51 and pivotally connected at its upper end to a member 64 which partially surrounds and is itself pivotally mounted in a lug carried by the handle 58. The attendant, by grasping the handle, thus maintains through the intermediation of the member 64, the catch 62 disengaged from the notches of the sector 61. When the attendant releases the handle, in the positions of Figures 11 and 13, the engagement of the catch in the corresponding notch of the sector is effected automatically by the spring clearly shown in Figures 11 and 13.

In the intermediate position (Figure 12), which is the loading position of the projectile, the loading device is locked in place by means of a latch 65 integral with a spindle 66 (Figures 12 and 14) carried by the longitudinal member 5, and to the rear extremity of which is keyed a lever 67, the extremity of which is engaged in a hole made in a spring catch 68. The function of this catch, for the operation of the latch 65, will be described below.

The rammer is a spring rammer, of known type; it is terminated at the back by an arm 69 adapted to swing about the axis of the body of the rammer, parallel to the axis of the gun. This arm 69 carries at its free end a roller 70 (Figures 11 to 15) which will be engaged by the cam 56 and moved thereby to the loading position of the projectile (Figure 12) which is also the releasing position of the rammer. The said rammer is moved on the recoil in known manner, to a longitudinal position which is always the same. It is released at the end of the swinging movement by the arm 69, in known manner, by a device not shown.

The control of the latch 65 may, for example, take place as follows:—

Figure 15:
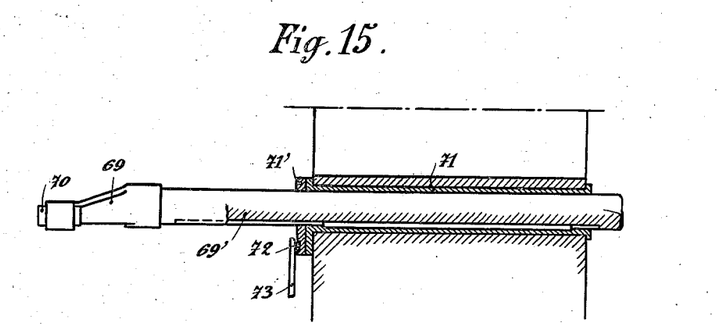
Figure 15 is a partial sectional elevation on a larger scale on the line XV—XV of Figure 12.

A socket or sleeve 71 is rotatably mounted in the breech block as shown in Figure 15, and carries in relatively sliding but non-rotatable engagement therewith, as by groove and key connection, the rod 69' carrying the rammer 69, the socket or sleeve thus being constantly impelled in rotation only, by the rod 69'. The said socket 71 has secured thereto a directional piece 71' in which there is cut a cam groove (Figure 12) in which engages a pin or knob 72 integral with a rod 73, the latter being movable in two guides 74, 74' (Figures 12 and 14) fixed on the rear face of the gun.

In the loading position of the gun (Figure 12), this rod 73 is out of contact, at its lower extremity, with the spring catch 68, above which the said rod is vertically displaced due to the rotational movement imparted to the rammer arm 69 by the engagement of cam 56 with roller 70, which movement is transmitted to rod 73 through cam plate 71' and pin 72. At this time spring catch 68 is forced to its uppermost position by its spring, as shown in Figure 12, swinging lever 67 about its axis 66 in a clockwise direction and bringing latch 65 into locking engagement with a suitable locking lug formed on arm 51. The latch 65 thus locks the movable loading trays 49'—50' in place while the rammer moves the projectile into the gun. When the projectile has been loaded, the rammer arm 69 is returned to the position shown in Figures 11 and 13 by known mechanism, and cam plate 71', in its movement corresponding to the rotation of arm 69 and sleeve 71 forces rod 73 downwardly into engagement with spring catch 68 and depresses the latter until it acts on lever 67 and releases latch 65 from its locking engagement with arm 51.

Under the continued effort exerted by the attendant on the handle 58 the loading device then takes up the position shown by Figure 13, which is the loading position of the cartridge case. When the attendant releases the manipulating handle 58, the spring catch 62 automatically locks the loading device; the same attendant can then ram the cartridge case into the gun either by hand or by mechanical means.

On again acting on the manipulating handle 58 the said attendant unlocks the loading device and can, by a thrust in the desired direction, cause it to pass directly from the position of Figure 13 to the waiting position of Figure 11, where the loading device receives a fresh charge (projectile and powder or cartridge case), this taking place during the recoil and the return of the gun to the firing position.

It will be understood that the complete installation for a pair of guns comprises a second receiving device similar to that just described but located symmetrically with respect to the longitudinal axial plane of the system of associated guns.

As will be seen, the particular constructional modification of the invention of the parent application which has been described permits of supplying two associated guns rapidly and simultaneously with ammunition composed of separate elements (projectile and cartridge case, for example), this result being obtained by a system of swivelling and rocking receiving elements similar to that of application Serial No. 681,980, but comprising four compartments, the said swivelling and rocking elements being combined with the superposed receiving conduits, each respectively taking ammunition elements; and each of these conduits, instead of being continuous as in the constructional form described in application Serial No. 681,980, comprises at its extreme rear end an oscillating element constructed in the form of a loading device arranged to be operated by hand by an attendant who brings it successively from a receiving position of rest to a position for loading a projectile, and then to a position for loading the propelling charge, contained or not contained in a cartridge case, and finally bringing the said oscillating element to its initial receiving position.

The practical means of constructing the oscillating element of the ammunition receiving mechanism, and the conjunction of this element with the usual rammer, may, of course, be carried out in various ways, the annexed drawings merely showing a preferred arrangement and being intended for purposes of illustration only.

The whole apparatus for receiving and transmitting elements of ammunition for two associated guns, as just described, may, of course, be provided with suitable safety devices preventing any untimely manipulation.

Various other changes, which will now appear to those skilled in the art, may be made in the form, details of construction and arrangement of the parts without departing from the spirit of the invention. Reference is therefore to be had to the appended claims for a definition of the limits of the invention.

What is claimed is:—

1. In apparatus for supplying to the guns of a rotatable twin gun mount ammunition of the type in which the projectile and propelling charge are separate, the combination of a fixed main hoist adapted to deliver a pair of projectiles and a pair of propelling charges simultaneously to a point between the guns, a member mounted above said hoist having four compartments symmetrically arranged in pairs, each pair of compartments being adapted to receive from said hoist and to retain a projectile and a propelling charge, respectively, a pair of superposed ammunition trays associated with each of said guns, means for simultaneously transferring the projectiles and propelling charges from said compartments to said trays, and means for successively moving the projectile and charge delivered to each pair of trays into loading position in alinement with the bore of the associated gun.

2. In apparatus for supplying to the guns of a rotatable twin gun mount ammunition of the type in which the projectile and propelling charge are separate, the combination of a fixed main hoist adapted to deliver a pair of projectiles and a pair of propelling charges simultaneously to a point between the guns, a member mounted above said hoist having four compartments symmetrically arranged in pairs, each pair of compartments being adapted to receive from said hoist and to retain a projectile and a propelling charge, respectively, a pair of superposed ammunition trays associated with each of said guns, each of said trays comprising one portion fixed with respect to its associated gun and another portion movable in a plane transverse to the axis of the bore thereof, means for simultaneously transferring the projectiles and the propelling charges from said compartments to said trays, and means for bringing the movable portions of each pair of trays successively into loading position in alinement with the bore of the associated gun.

3. In apparatus for supplying to the guns of a rotatable twin gun mount ammunition of the type in which the projectile and propelling charge are separate, the combination of a fixed main hoist adapted to deliver a pair of projectiles and a pair of propelling charges simultaneously to a point between the guns, a member mounted above said hoist having four compartments symmetrically arranged in pairs, each pair of compartments being adapted to receive from said hoist and to retain a projectile and a propelling charge, respectively, a pair of superposed ammunition trays associated with each of said guns, each of said trays comprising one portion fixed with respect to its associated gun and another portion pivotally mounted about an axis parallel to the bore thereof, means for simultaneously transferring the projectiles and propelling charges from said compartments to said trays, and means for moving the pivotally mounted portions of each pair of trays about their axis to bring them successively into loading position in alinement with the bore of the associated gun.

4. In apparatus for supplying to the guns of a rotatable twin gun mount ammunition of the type in which the projectile and propelling charge are separate, the combination of a fixed main hoist adapted to deliver a pair of projectiles and a pair of propelling charges simultaneously to a point between the guns, a member mounted above said hoist having four compartments symmetrically arranged in pairs, each pair of compartments being adapted to receive from said hoist and to retain a projectile and a propelling charge, respectively, a pair of superposed ammunition trays associated with each of said guns, each of said trays comprising one portion fixed with respect to its associated gun and another portion mounted for compound pivotal movement with respect to a plurality of axes parallel to the bore thereof, means for simultaneously transferring the projectiles and propelling charges from said compartments to said trays, and means for moving the pivotally mounted portions of each pair of trays about their axes to bring them successively into loading position in alinement with the bore of the associated gun.

5. In apparatus for supplying to the guns of a rotatable twin gun mount ammunition of the type in which the projectile and propelling charge are separate, the combination of a fixed main hoist adapted to deliver a pair of projectiles and a pair of propelling charges simultaneously to a point between the guns, a member mounted above said hoist having four compartments for receiving and retaining the ammunition delivered by said hoist, a frame in which said member is pivoted for movement about a horizontal axis, means for swivelly mounting said frame for rotation about a vertical axis whereby said horizontal axis may be moved to a position parallel to the trunnion axes of said guns, a pair of ammunition receiving trays fixed with respect to each of said guns and adapted to simultaneously receive a projectile and a propelling charge from said member when the latter is tilted about said horizontal axis, a pair of loading trays normally positioned in extension of each of said pair of receiving trays and adapted to receive a projectile and propelling charge therefrom, and means for moving the loading trays of each of said pairs successively into alinement with the bore of their associated gun in positions such that the projectiles and propelling charges may be loaded therefrom into the guns in proper order.

6. In apparatus for supplying to the guns of a rotatable twin gun mount ammunition of the type in which the projectile and propelling charge are separate, the combination of a fixed main hoist adapted to deliver a pair of projectiles and a pair of propelling charges simultaneously to a point between the guns, a member mounted above said hoist having four compartments for receiving and retaining the ammunition delivered by said hoist, a frame in which said member is pivoted for movement about a horizontal axis, means for swivelly mounting said frame for rotation about a vertical axis whereby said horizontal axis may be moved to a position parallel to the trunnion axes of said guns, a pair of superposed ammunition receiving trays fixed with respect to each of said guns and adapted to simultaneously receive a projectile and a propelling charge from said member when the latter is tilted about said horizontal axis, a pair of loading trays normally positioned in extension of each of said pair of receiving trays and adapted to receive a projectile and a propelling charge therefrom, each pair of said loading trays being pivotally mounted for movement about an axis parallel to the bore of the associated gun, and means for moving said loading trays about their axes so as to bring the trays of each pair successively into alinement with the bore of the associated gun in positions such that the projectiles and propelling charges may be loaded therefrom into the guns in proper order.

7. In apparatus for supplying to the guns of a rotatable twin gun mount ammunition of the type in which the projectile and propelling charge are separate, the combination of a fixed main hoist adapted to deliver a pair of projectiles and a pair of propelling charges simultaneously to a point between the guns, a member mounted above said hoist having four compartments for receiving and retaining the ammunition delivered by said hoist, a frame in which said member is pivoted for movement about a horizontal axis, means for swivelly mounting said frame for rotation about a vertical axis whereby said horizontal axis may be moved to a position parallel to the trunnion axes of said guns, a pair of superposed ammunition receiving trays fixed with respect to each of said guns and adapted to simultaneously receive a projectile and a propelling charge from said member when the latter is tilted about said horizontal axis, a pair of loading trays normally positioned in extension of each of said pair of receiving trays and adapted to receive a projectile and propelling charge therefrom, each pair of said loading trays being mounted for compound pivotal movement with respect to a plurality of axes parallel to one another and to the bore of the associated gun, and means for moving each pair of loading trays about its axes to bring the projectile and charge containing trays thereof successively into alinement with the bore of the associated gun in positions such that the projectile and propelling charge may be loaded therefrom into the gun in proper order.

8. In apparatus for supplying a gun with ammunition of the type in which the projectile and propelling charge are separate, the combination of a pair of loading trays normally laterally displaced from the axis of the bore of the gun, means for delivering a projectile to one of said trays and a propelling charge to the other, means for mounting said trays for movement in a plane transverse to the axis of the bore of said gun, means for moving said trays to bring the projectile and propelling charge successively into loading position in alinement with said bore, a rammer carried by said gun and normally positioned out of alinement with the bore thereof, means for moving said rammer into alinement with the projectile and bore of said gun when said trays are moved to projectile loading position, and means controlled by the movements of said rammer for locking said trays in projectile loading position.

9. In apparatus for supplying a gun with ammunition of the type in which the projectile and propelling charge are separate, the combination of a pair of loading trays normally laterally displaced from the axis of the bore of the gun, means for delivering a projectile to one of said trays and a propelling charge to the other, means for mounting said trays for movement in a plane transverse to the axis of the bore of said gun, manually operable means for moving said trays to bring the projectile and propelling charge successively into loading position in alinement with said bore, means associated with said manually operable means for locking said trays in normal ammunition receiving position and in the loading position wherein the propelling charge is in alinement with said bore, a rammer carried by said gun and normally positioned out of alinement with the bore thereof, means for moving said rammer into alinement with the projectile and bore of said gun when said trays are moved to projectile loading positon, and means controlled by the movements of said rammer for locking said trays in projectile loading position.

10. In apparatus for supplying a gun with ammunition of the type in which the projectile and propelling charge are separate, the combination of a fixed hoist for delivering a projectile and a propelling charge to a point adjacent the gun, a member mounted above said hoist having a pair of compartments adapted to receive from said hoist and to retain said projectile and said propelling charge, respectively, means for pivotally mounting said member for movement about an axis substantially parallel to the axis of the trunnions of the gun, a pair of rigidly connected loading trays normally laterally displaced from the axis of the bore of the gun, means for transferring said projectile to one of said trays and said propelling charge to the other when said member has been rotated about its axis to a position wherein said compartments are in alignment with said trays, a supporting member pivotally mounted at one end for movement about an axis fixed with respect to said gun and parallel to the axis of the bore thereof, the other end of said member being pivotally connected to said rigidly connected trays, means for moving said trays and supporting member about said fixed axis, and means operative during said movement to move said trays relatively to said supporting member about the pivotal connection therewith, whereby the projectile and propelling charge may be successively brought into loading position in alinement with the bore of said gun.

11. In apparatus for supplying a gun with ammunition of the type in which the projectile and propelling charge are separate, the combination of a fixed hoist for delivering a projectile and a propelling charge to a point adjacent the gun, a member mounted above said hoist having a pair of compartments adapted to receive from said hoist and to retain said projectile and said propelling charge, respectively, means for pivotally mounting said member for movement about an axis substantially parallel to the axis of the trunnions of the gun, a pair of rigidly connected loading trays normally laterally displaced from the axis of the bore of the gun, means for transferring said projectile to one of said trays and said propelling charge to the other when said member has been rotated about its axis to a position wherein said compartments are in alignment with said trays, a supporting member pivotally mounted at one end for movement about an axis fixed with respect to said gun and parallel to the axis of the bore thereof, the other end of said member being pivotally connected to said rigidly connected trays, means for moving said trays and supporting member about said fixed axis, means operative during said movement to move said trays relatively to said supporting member about the pivotal connection therewith, whereby the projectile and propelling charge may be successively brought into loading position in alinement with the bore of said gun, and means for locking said supporting member against movement when said trays are in normal ammunition receiving position, projectile loading position and charge loading position, respectively.

12. In apparatus for supplying a gun with ammunition of the type in which the projectile and propelling charge are separate, the combination of a fixed hoist for delivering a projectile and a propelling charge to a point adjacent the gun, a member mounted above said hoist having a pair of compartments adapted to receive from said hoist and to retain said projectile and said propelling charge, respectively, means for pivotally mounting said member for movement about an axis substantially parallel to the axis of the trunnions of the gun, a pair of rigidly connected loading trays normally laterally displaced from the axis of the bore of the gun, means for transferring said projectile to one of said trays and said propelling charge to the other when said member has been rotated about its axis to a position wherein said compartments are in alignment with said trays, a supporting member pivotally mounted at one end for movement about an axis fixed with respect to said gun and parallel to the axis of the bore thereof, the other end of said member being pivotally connected to said rigidly connected trays, manually operable means for moving said trays and supporting member about said fixed axis, means operative during said movement to move said trays relatively to said supporting member about the pivotal connection therewith, whereby the projectile and propelling charge may be successively brought into loading position in alinement with the bore of said gun, and means associated with said manually operable means for locking said supporting member against movement when said trays are in normal ammunition receiving position and in the loading position wherein the propelling charge is in alinement with said bore.

13. In apparatus for supplying a gun with ammunition of the type in which the projectile and propelling charge are separate, the combination of a fixed hoist for delivering a projectile and a propelling charge to a point adjacent the gun, a member mounted above said hoist having a pair of compartments adapted to receive from said hoist and to retain said projectile and said propelling charge, respectively, means for pivotally mounting said member for movement about an axis substantially parallel to the axis of the trunnions of the gun, a pair of rigidly connected loading trays normally laterally displaced from the axis of the bore of the gun, means for transferring said projectile to one of said trays and said propelling charge to the other when said member has been rotated about its axis to a position wherein said compartments are in alignment with said trays, a supporting member pivotally mounted at one end for movement about an axis fixed with respect to said gun and parallel to the axis of the bore thereof, the other end of said member being pivotally connected to said rigidly connected trays, means for moving said trays and supporting member about said fixed axis, means operative during said movement to move said trays relatively to said supporting member about the pivotal connection therewith, whereby the projectile and propelling charge may be successively brought into loading position in alinement with the bore of said gun, a rammer carried by said gun and normally positioned out of alinement with the bore thereof, and means carried by said supporting member for engaging and moving said rammer into alinement with the projectile and bore of said gun when said trays and supporting member are moved to projectile loading position.

14. In apparatus for supplying a gun with ammunition of the type in which the projectile and propelling charge are separate, the combination of a pair of rigidly connected loading trays normally laterally displaced from the axis of the bore of the gun, means for delivering a projectile to one of said trays and a propelling charge to the other, a supporting member pivotally mounted at one end for movement about an axis fixed with respect to said gun and parallel to the axis of the bore thereof, the other end of said member being pivotally connected to said rigidly connected trays, means for moving said trays and supporting member about said fixed axis, means operative during said movement to move said trays relatively to said supporting member about the pivotal connection therewith, whereby the projectile and propelling charge may be successively brought into loading position in alinement with the bore of said gun, a rammer carried by said gun and normally positioned out of alinement with the bore thereof, means carried by said supporting member for engaging and moving said rammer into alinement with the projectile and bore of said gun when said trays and supporting member are moved to projectile loading position, and means controlled by the movements of said rammer for engaging and locking said supporting member against movement when said trays are in projectile loading position.

LEON DAUM.